Figure 1:
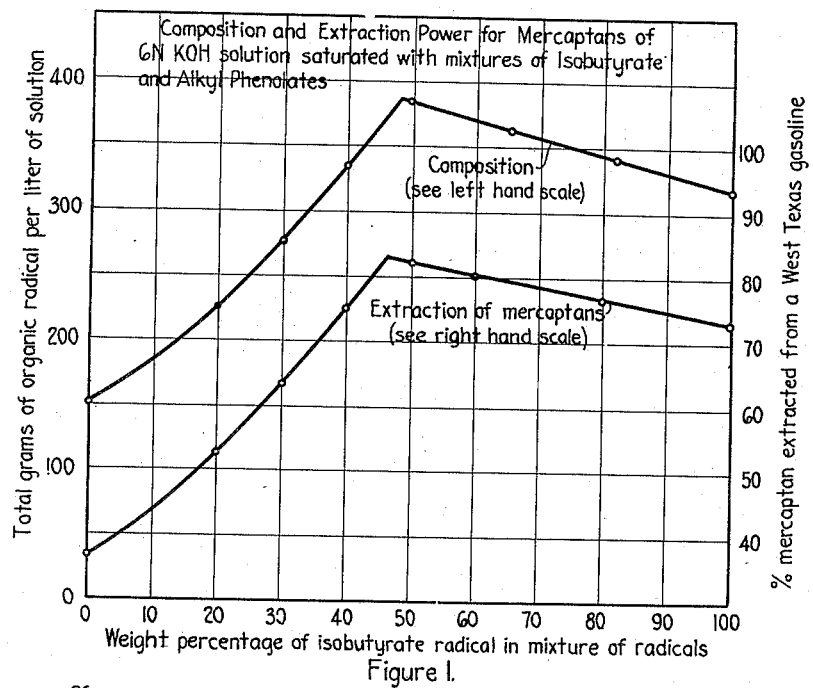

Dec. 3, 1940.   D. L. YABROFF ET AL   2,223,798
PROCESS FOR THE REMOVAL OF ACID COMPONENTS FROM HYDROCARBON DISTILLATES
Filed Feb. 10, 1939

Inventors:
David Louis Yabroff
Ellis R. White
By their Attorney

Patented Dec. 3, 1940

2,223,798

UNITED STATES PATENT OFFICE 2,223,798

PROCESS FOR THE REMOVAL OF ACID COMPONENTS FROM HYDROCARBON DISTILLATES

David Louis Yabroff, Berkeley, and Ellis R. White, Albany, Calif., assignors to Shell Development Company, San Francisco, Calif., a corporation of Delaware Application February 10, 1939, Serial No. 255,684

11 Claims. (Cl. 196—30)

This application is a continuation-in-part of our copending application Serial No. 219,322, filed July 15, 1938, and deals with the removal of weak organic acids having dissociation constants below about $10^{-5}$, such as mercaptans, alkyl phenols, thiophenols, etc., from their solutions in water-insoluble organic liquids. More particularly it is concerned with the treatment of hydrocarbon distillates containing mercaptans with aqueous solutions of strong bases containing dissolved substantial amounts of solubility promoters or solutizers for said organic acids, as well as certain gum inhibitors.

It is a purpose of this invention to remove weak organic acids, particularly those having dissociation constants below about $10^{-5}$ from their solutions in water-insoluble organic liquids by treating said liquids with aqueous solutions of strong bases containing substantial amounts of solutizers, which solutions are capable of regeneration by steam stripping. It is another purpose to sweeten sour hydrocarbon distillates containing mercaptans by extracting the largest portion of the mercaptans, thereby reducing the sulfur contents of said distillates; and it is a further purpose to produce in a single operation extracted distillates of reduced sulfur contents which contain a sufficient amount of gum inhibitors to prevent their rapid deterioration.

We have already disclosed that mercaptans or similar weak organic acids may be removed effectively from their solutions in organic water-insoluble liquids, such as hydrocarbon oils, by extracting said organic liquids with aqueous solutions of a strong base in which is dissolved a substantial amount of a substance acting as solubility promoter or solutizer for the organic acids. In several copending applications we have disclosed many suitable solutizers, all of which have the following common properties: they promote the solubility of the weak organic acid in the aqueous phase; they are readily soluble in the aqueous solution of the base and substantially insoluble in the water-immiscible organic liquids to be extracted; they are inert to the action of the strong base even at elevated temperatures of steam stripping; they boil substantially above the boiling temperature of water so that spent solutions of the base containing absorbed mercaptans and the like can be regenerated by simple steam stripping without loss of the solutizer; when dissolved in the aqueous base solution in effective amounts, they do not or should not raise the viscosity of the solution to such an extent to prevent the clean separation of the aqueous solution from the organic liquid.

The following are some of the most useful solutizers disclosed in the copending applications: aliphatic alkanolamines and amino alkyl-amines in which the alkyl radicals contain 2 or 3 carbon atoms; diamino alcohols, glycols and amino glycols of 3 to 5 carbon atoms; alkyl glycerines in which the total number of carbon atoms in the alkyl radicals is from 1 to 4; mono methyl glyceryl ether; diamino, dihydroxy or amino hydroxy alkyl ethers or thioethers in which the alkyl radicals have from 2 to 3 carbon atoms; alkali metal salts of fatty acids having from 3 to 5 carbon atoms, or, in the case of potassium salts, having from 1 to 6 carbon atoms, amino or hydroxy fatty acids having from 2 to 7 carbon atoms, phenyl acetic acid, hydroxy or amino phenyl acetic acid, alkyl phenols, etc.

The amounts of the solutizers normally employed in solution of the aqueous base may range from about 15% to 85%, and preferably from 25% to 75%, if they are normally liquid and miscible with the base solution in all proportions; in the case of salts and other normally solid solutizers, the aqueous solution may be substantially saturated therewith, e. g., about 95%, and preferably between about 30% to 90% saturated at the lowest operating temperature to be encountered.

The amount of water in the aqueous solution should be more than 5%, and preferably between 15% and 70%. This is desirable to make possible easy regenerability by simple steam stripping, and in some instances to reduce losses of solutizers to a minimum by dissolution in the organic water-insoluble liquid. However, when treating hydrocarbon distillates, the latter reason is usually of minor consideration, since the suitable solutizers listed above are substantially insoluble in hydrocarbon distillates even in the presence of water much less than 15%, e. g., less than 10% or 5%.

Water-immiscible organic liquids capable of being treated by our process are neutral or basic, and must be substantially inert to the action of strong bases under the conditions of the treatment, i. e., at about normal room temperature, for a period of at least about 10 minutes. Examples of such liquids are hydrocarbon distillates such as gasoline, kerosene, etc.; pentane, hexane, benzene, toluene, xylene, chlorinated hydrocarbons, such as carbon tetrachloride, dichlorethylene, chlorpropane, water-insoluble nitrogen bases as alkllated pryidines, etc.

Various strong bases may be used. While alkali metal hydroxides, in particular potassium and sodium hydroxides, are preferred, ammonia, quaternary ammonium bases, alkali metal carbonates, etc., may also be suitable. When using alkali metal hydroxides, we prefer them in concentrations not less than about 1 normal and preferably from 2 to 10 normal, although weaker solutions are not inoperative.

Normally, the extraction of the organic acids is carried out at about room temperature, although higher or lower temperatures, e. g., from about 32° to 140° F., may be used. At temperatures substantially below about 32° F., the high viscosity of the aqueous solution and/or the precipitation of a portion of the solutizer may cause serious difficulties, and at temperatures substantially above about 140°, extraction efficiency diminishes rapidly.

Among the above-enumerated solutizers, alkyl phenols take a somewhat unique position. While in relatively high concentrations they are very effective in the matter of promoting the solubility of mercaptans and other weak organic acids in aqueous solutions of caustic alkali, such solutions having a high concentration of alkyl phenols are so viscous that difficulties will arise in the operation of extraction due to entrainment of the organic water-insoluble liquid. This has been fully disclosed in our copending application, Serial No. 215,804, filed June 25, 1938. In order to prevent excessive losses of the organic solvent by entrainment in the aqueous phase, it is necessary that the viscosity of the latter be below about 37½ centistokes at the temperature of the extraction, that is, for most practical purposes at about normal room temperature. Therefore, in practice, full advantage cannot be taken of the solutizing properties of the alkyl phenols, and for this reason alkyl phenolates alone are not the best known solutizers This is doubly unfortunate because water-insoluble organic liquids, such as hydrocarbons, when treated with alkaline alkyl phenolate solutions, may, and usually do, retain a trace of alkyl phenols just enough to make them fairly stable toward oxidation, whereas the same organic liquids, when extracted with aqueous caustic alkali free from alkyl phenolates, containing a solutizer other than alkyl phenolates, are usually easily and quickly attacked by oxygen.

It is further known that alcohols may be added to alkaline alkyl phenolate solutions for the purpose of extracting mercaptans. This expedient effectively reduces the viscosity of the alkyl phenolate solutions, but has the serious disadvantage of making it very difficult to recover the spent alkaline aqueous solution containing mercaptides, as by steaming. Unless recovery of the spent caustic alkali solution is simple and inexpensive, the extraction process, for instance, as applied to the sweetening of sour hydrocarbon oils, is commercially useless.

Thus, while the use of alkyl phenolates for promoting the solubility of the weak organic acids in aqueous caustic alkali is highly desirable, it has heretofore not been possible to use them economically because of the high viscosities of caustic solutions containing them or because of the impossibility of regenerating these solutions by simple steam stripping, or because of both.

Now we have discovered that aqueous solutions of strong bases containing mixtures of alkyl phenolates and at least one of the solutizers other than alkyl phenolates above-disclosed have properties which make them eminently suitable for treating organic water-insoluble liquids containing weak organic acids such as mercaptans. Such aqueous treating solutions have advantages not shared by similar solutions containing individual solutizers, and are superior to the alcoholic alkaline alkyl phenolate solutions by reason of the fact that the former may be regenerated by steam stripping after completed extraction without substantial loss of solubility promoters.

We have found that aqueous caustic alkali solutions containing at least 2 solutizers, one comprising alkyl phenolates and the other comprising a solutizer other than a hydroxy aromatic compound, combine the following advantages: (1) For equal extraction powers for the weak organic acids, they have lower viscosities than alkaline solutions containing alkyl phenolates alone. (2) They are capable of holding in solution more solutizer than solutions containing alkyl phenolates alone, and hence are capable of more thoroughly extracting the weak organic acids, in particular mercaptans. (3) They are regenerable by steam stripping. (4) Organic water-insoluble liquids treated with a mixed solutizer solution retain traces of alkyl phenolates which render them relatively resistant to oxygen attack. (5) The presence of substantial amounts of alkyl phenolates in the aqueous caustic alkali solution makes possible the use of certain carboxylic acid salts for solvent promoting purposes, which salts were heretofore considered useless because of their insufficient solubility in the aqueous solution. Examples of such salts are the alkali metal salts of benzoic acid and fatty acids of 7 and 8 carbon atoms.

We have further found that in mixtures of solutizers, one of which comprises alkyl phenolates, the latter may be substituted partially or totally by certain other hydroxy aromatic compounds having oxidation inhibiting properties which in solution of aqueous caustic alkali are relatively stable and which preferably when coming in contact with air do not at once turn black. For example, amino phenols, such as p-benzyl amino phenol, p-amyl amino phenol, etc.; or naphthols as alpha naphthol, amino and/or alkyl substituted naphthols, etc., may be used instead of the alkyl phenols. Polyhydroxy aromatic oxidation inhibitors, such as the hydroquinones, catechols, pyrogallols, etc., are less desirable though not inoperative, because they themselves oxidize rather rapidly, turning black.

The influence of solutizers other than hydroxy aromatic compounds on the total amounts of solutizers which can be dissolved in caustic alkali solutions containing alkyl phenols, as well as on the viscosity of these solutions, is illustrated by the behavior of mixtures of potassium isobutyrate and alkyl phenolates as discussed below.

The total amounts of the potassium salts of alkyl phenols, isobutyric acid, or an equal mixture of the two, which are necessary to saturate a 6N KOH solution are as follows:

| Potassium salt | Gms. organic radicals per liter of saturated solution |
|---|---|
| Alkyl phenolate | 155 |
| Isobutyrate | 316 |
| Mixture | 374 |

In Fig. 1 of the attached drawing, curve 1 shows a more complete solubility relation of the potassium alkyl phenolates and isobutyrates in the 6N KOH solution. To obtain this curve, the weight percent of isobutyrate radical in the mixture of isobutyrate-alkyl phenolate radicals was plotted against the total content of grams of the mixture of radicals per liter of the saturated solution.

Curve 2 of the same figure shows the relation of percent mercaptans extracted from a West Texas straight run gasoline by treating same at room temperature with 10% by volume of a 6N aqueous KOH solution saturated with various mixtures of potassium isobutyrate-alkyl phenolates. As will be noted, mixtures containing about equal amounts of isobutyrate and alkyl phenolate are most effective, and the peaks of curves 1 and 2 coincide approximately with respect to the composition of the mixture of alkyl phenolates-isobutyrate. Such a coincidence may not be found with all homologues of fatty acid salts. In mixtures of alkyl phenolates and formates, for instance, the peaks of the extraction efficiency and of maximum content of organic radicals would not coincide.

Similar curves are found for salts of sodium and other alkali metals, as well as for mixtures of alkyl phenolates with salts of other aliphatic or aromatic hydrocarbon mono carboxylic acids, preferably having a total number of carbon atoms from one to 8 and which, if desired, may contain an amino or hydroxy substitution radical. While carboxylic acids containing a number of carbon atoms greater than 8 are not inoperative, serious emulsion difficulties may arise from their use.

In the table below, the compositions of several saturated solutions as obtained from curves similar to those shown in the drawing, containing maximum concentrations of solutizer ions are shown, together with their partition coefficients K for n-amyl mercaptans at 68° F. between the aqueous solution and iso-octane.

$$K = \frac{\text{percent mercaptan in aqueous solution}}{\text{percent mercaptan in iso-octane}}$$

For comparison is also shown the percent mercaptans extracted by treating in a single stage a West Texas full range gasoline containing .0689% mercaptan sulfur with 10% by volume of the solutions having the above compositions:

| Solutizer other than alkyl phenolate | Composition of aqueous solution, solutizer radicals | | K for n-amyl mercaptan at 60° F. | Percent mercaptan removed from West Texas gasoline |
|---|---|---|---|---|
| | Total, gm./l. | Alkyl phenolates, percent by weight of total | | |
| None | 0 | 0 | 1.84 | 7.1 |
| Do | 110.8 | 100 | 37.1 | 27.3 |
| Acetate | 366 | 0 | 142 | 37.1 |
| Do | 428 | 50 | 1510 | 83.5 |
| Heptylate | 22 | 0 | | |
| Do | 142 | 62 | | |
| Caprylate | 20 | 0 | 7.7 | 15.9 |
| Do | 150 | 53 | 56 | 40 |
| Phenyl acetate | 212 | 0 | 78.4 | 42.5 |
| Do | 265 | 26.5 | 163 | 57 |
| Benzoate | 8 | 0 | 2.0 | 8.8 |
| Do | 130 | 90 | 49 | 31.8 |

Figure 2:
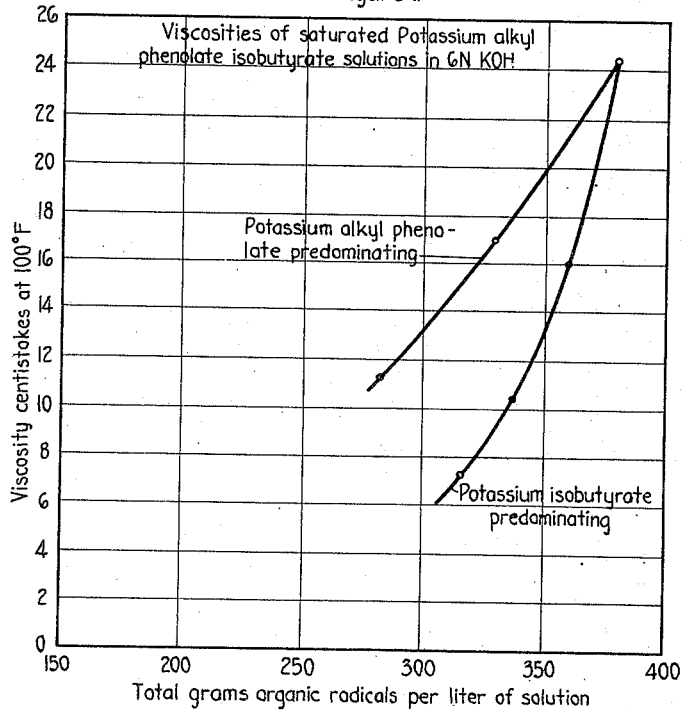

The effect of the addition of solutizers other than alkyl phenols to alkyl phenolate solutions on the viscosity is illustrated in Fig. 2 of the attached drawing in which the viscosities of 6 normal KOH solutions saturated with various potassium alkyl phenolate-isobutyrate mixtures are plotted against their total contents of organic radicals. It will be noted that of two alkyl phenolate-isobutyrate mixtures containing equal amounts of total organic radicals, one having predominating amount of alkyl phenolate radicals and the other of isobutyrate radicals, the latter has the lower viscosity.

In another example in which the viscosities of two solutized aqueous caustic soda solutions of equal extraction powers for mercaptans were compared, one solution containing alkyl phenolates only, and the other a mixture of alkyl phenolates and isobutylene glycol, the following data were obtained:

| Solutized caustic soda solution | K for n-amyl mercaptan against iso-octane at 20° C. | Viscosity (centistokes) at— | |
|---|---|---|---|
| | | 0° C. (32° F.) | 37° C. (100° F.) |
| 221 gm./liter alkyl phenolate radicals in 5N NaOH | 36.2 | 132 | 15.60 |
| 102.5 gm./liter alkyl phenolate radicals+125 gm./liter isobutylene glycol in 5N NaOH | 37.0 | 55.55 | 7.771 |

The amounts of the aqueous alkaline solutions containing solutizers used in the extraction may vary between wide limits. Normally we employ an amount of the aqueous solution equal to about 5 to 100 volume percent of the organic liquid to be extracted. The extraction may be effected by merely mixing the organic liquid containing the organic acids with the aqueous alkaline solution, allowing the mixture to segregate and then separating the resulting segregated layers. Countercurrent extraction methods may be employed in which the organic liquid and the aqueous alkaline solution are passed in opposite directions either through a tower or through a series of mixers and settlers.

When extracting mercaptans from sour hydrocarbon distillates by our method, sweet distillates are frequently obtained. Occasionally a small amount of mercaptans may remain in the distillate, giving the latter a slightly sour reaction. This residue may be converted to disulfides, if desired, the amount of disulfides so formed normally being so small as to have no harmful effect on the resulting distillate with regard to knock rating, lead susceptibility, etc.

Regeneration of the spent alkali metal hydroxide solution containing the mixture of alkyl phenolate, fatty acid salt, mercaptides and possibly other organic substances of the type hereinbefore described, may be accomplished preferably by steaming in accordance with the principles disclosed in our co-pending application Serial No. 174,512, filed November 15, 1937.

The following examples further illustrate our process:

*Example I*

A West Texas gasoline containing .073% mercaptan sulfur was countercurrently treated at 90° F. in three and six stages, respectively, with 30% by volume of a 6 normal KOH solution containing both potassium isobutyrate and potassium alkyl phenolate, the normality of the butyrate being 1.85 and that of the phenolate 1.5. The treated gasoline had a mercaptan sulfur content of .0045% after the three stage treatment and .0020% after the six stage treatment.

When countercurrently extracting the same gasoline under the conditions described above with a 6 normal KOH solution which was substantially saturated with potassium isobutyrate only, the mercaptan sulfur content of the treated gasoline after three stages was .0134% and after six stages .0085%.

Example II

Samples of a sour cracked California gasoline having an induction period of 15 hours by the oxygen bomb test were extracted in a single stage with 10% by volume of various solutions of alkali metal hydroxides with and without gum inhibitors added thereto. The induction periods of the several samples were then determined. Experiments and results were as follows:

| Caustic alkali+solutizer | Induction period, hours |
|---|---|
| 6N KOH+135 gm./liter potassium isobutyrate | .3 |
| 6N KOH+135 gm./liter potassium isobutyrate+135 gm./liter alkyl phenolate | 4.0 |
| 40° Bé. NaOH+1 volume alkyl phenols | 4.33 |
| 5 normal NaOH+1 normal sodium phenyl acetate | 3.75 |
| 5N NaOH+1 normal sodium phenyl acetate+100 gm./liter tertiary butyl catechol | 4.0 |
| 3 normal NaOH+50 volume % propylene glycol | 1.27 |
| 3 normal NaOH+50 volume % propylene glycol+100 gm./liter alpha naphthol | 1.75 |

We claim as our invention:

1. In the process of separating organic acids having dissociation constants below about $10^{-5}$ from an organic water-insoluble liquid in which they are dissolved and which is substantially inert toward strong bases under the conditions of the process, the steps comprising treating said liquid with an aqueous solution of a strong base containing dissolved a substantial amount of a mixture of solubility promoter for said organic acids, said solubility promoter having boiling temperatures higher than water, being inert to said base under steam stripping conditions and being substantially insoluble in said organic liquids, said mixture comprising a hydroxy aromatic compound having oxidation inhibiting properties being soluble and substantially stable in said aqueous base solution and an alkali metal salt of a hydrocarbon monocarboxylic acid having from 1 to 8 carbon atoms, under conditions to absorb at least a portion of said organic acids in said aqueous solution and to form two liquid layers, one comprising an aqueous layer of the base containing absorbed organic acids, and the other consisting essentially of treated organic liquid, and separating the layers.

2. In the process of separating mercaptans from an organic water-insoluble liquid in which they are dissolved and which is substantially inert toward aqueous caustic alkali under the conditions of the process, by extraction with an aqueous solution of an alkali metal hydroxide, the improvement comprising extracting said organic liquid with an aqueous solution of an alkali metal hydroxide containing a substantial amount of a mixture of an alkali metal phenolate and an alkali metal salt of a hydrocarbon monocarboxylic acid having from 1 to 8 carbon atoms under conditions to absorb at least a portion of said mercaptans in the aqueous solution and to form two layers, one comprising an aqueous alkali metal hydroxide layer containing alkyl phenolate, carboxylic acid salt and mercaptides, and the other consisting essentially of organic liquid, and separating the layers.

3. The process of claim 2 in which the organic liquid is a hydrocarbon distillate.

4. The process of claim 2 in which the carboxylic acid is isobutyric acid.

5. The process of claim 2 in which the alkali metal hydroxide solution is between 30% and 95% saturated with the mixture of alkali metal alkyl phenolates and carboxylic acid salt.

6. The process of claim 2 in which the aqueous solution of alkali metal hydroxide is substantially saturated with the mixture of alkyl phenolate and carboxylic acid salt.

7. The process of claim 2 in which the concentration of the alkali metal hydroxide in aqueous solution is from 2 to 10 normal.

8. The process of claim 2 in which the organic liquid is extracted with an amount of aqueous solution equal to 5 to 100 volume percent of the organic liquid.

9. In the process of separating mercaptans from an organic water-insoluble liquid in which they are dissolved and which is substantially inert toward aqueous caustic alkali under the conditions of the process, by extraction with an aqueous solution of an alkali metal hydroxide, the improvement comprising extracting said organic liquid with an aqueous solution of potassium hydroxide containing a substantial amount of a mixture of potassium alkyl phenolate and the potassium salt of a hydrocarbon monocarboxylic acid having from 1 to 8 carbon atoms under conditions to absorb at least a porton of said mercaptans in the aqueous solution and to form two layers, one comprising an aqueous potassium hydroxide layer containing alkyl phenolate, carboxylic acid salt and mercaptides, and the other consisting essentially of organic liquid, and separating the layers.

10. In the process of separating mercaptans from an organic water-insoluble liquid in which they are dissolved and which is substantially inert toward aqueous caustic alkali under the conditions of the process, by extraction with an aqueous solution of an alkali metal hydroxide, the improvement comprising extracting said organic liquid with an aqueous solution of potassium hydroxide containing a substantial amount of a mixture of potassium alkyl phenolate and potassium isobutyrate under conditions to absorb at least a portion of said mercaptans in the aqueous solution and to form two layers, one comprising an aqueous potassium hydroxide layer containing alkyl phenolates, isobutyrate and mercaptides, and the other consisting essentially of the organic liquid, and separating the layers.

11. The process of claim 10 in which the mixture contains about equal weights of alkyl phenol and isobutyrate radicals.

DAVID LOUIS YABROFF.
ELLIS R. WHITE.